United States Patent
Chezzi et al.

(10) Patent No.: US 7,490,391 B2
(45) Date of Patent: Feb. 17, 2009

(54) BEAD TRIMMER WITH A TOOL EXTRACTION SYSTEM

(75) Inventors: Aleardo Chezzi, Boretto (IT); Luciano Micali, Guastalla (IT)

(73) Assignee: Oto Mills S.p.A., Boretto (Reggio Emilia) (IT)

( * ) Notice: Subject to any disclaimer, the term of this patent is extended or adjusted under 35 U.S.C. 154(b) by 582 days.

(21) Appl. No.: 10/556,822

(22) PCT Filed: May 26, 2004

(86) PCT No.: PCT/IT2004/000305

§ 371 (c)(1),
(2), (4) Date: Nov. 15, 2005

(87) PCT Pub. No.: WO2004/113005

PCT Pub. Date: Dec. 29, 2004

(65) Prior Publication Data

US 2007/0023480 A1    Feb. 1, 2007

(30) Foreign Application Priority Data

Jun. 23, 2003   (IT) .......................... MO2003A0184

(51) Int. Cl.
*B23P 15/00* (2006.01)
*B23D 7/00* (2006.01)

(52) U.S. Cl. ..................... 29/33 A; 29/33 T; 409/298; 409/310; 409/313; 409/317; 409/339; 409/343

(58) Field of Classification Search ............... 29/33 A, 29/33 D, 33 T, 27 C, 27 R; 409/297, 298, 409/301, 299–300, 303, 304, 308, 310, 313, 409/317, 321, 322–325, 337–338, 339, 343, 409/345, 138, 139, 140, 202, 212; 483/54–55
See application file for complete search history.

(56) References Cited

U.S. PATENT DOCUMENTS

| 2,959,842 | A | | 11/1960 | Meyers |
| 4,831,906 | A | * | 5/1989 | Sugimoto et al. ............. 82/118 |
| 4,949,443 | A | * | 8/1990 | Saruwatari et al. .......... 29/27 C |
| 4,987,668 | A | * | 1/1991 | Roesch ........................ 483/30 |
| 5,131,136 | A | * | 7/1992 | Uchida et al. .................. 483/5 |
| 5,192,013 | A | | 3/1993 | Abbey et al. |
| 5,823,722 | A | * | 10/1998 | Takenaka .................... 409/230 |
| 6,321,431 | B1 | * | 11/2001 | Ziemek ..................... 29/81.12 |
| 6,514,183 | B2 | * | 2/2003 | Hoppe ......................... 483/46 |

FOREIGN PATENT DOCUMENTS

| DE | 3831082 A1 | * | 3/1990 |
| EP | 1016497 A2 | * | 7/2000 |
| JP | 2000-126953 A | * | 5/2000 |

* cited by examiner

OTHER PUBLICATIONS

Machine translation of DE 3831082.*

*Primary Examiner*—Erica E Cadugan
(74) *Attorney, Agent, or Firm*—Young & Thompson

(57) ABSTRACT

The bead trimmer is preferably applied in a production line for elements having longitudinal weld beads (21), where an element slides along a parallel direction to a longitudinal axis thereof (x), and comprises a tool-bearing turret (2) for removable fixing of a trimming tool (30), associated to a first slide (3) which is slidable along a horizontal direction (y) which is transversal with respect to the longitudinal axis (x) between an internal position, in which the tool (30) is aligned with the weld bead (21), and an external position, in which the tool (30) is not aligned with the weld bead (21). The first slide (3) is associated to a second slide (4) which is vertically slidable on a bearing structure (40) along a vertical direction (z) between a lowered position, in which the tool (30) is in contact with the weld bead (21), and a raised position, in which the tool (30) is distanced from the weld bead (21).

8 Claims, 2 Drawing Sheets

BEAD TRIMMER WITH A TOOL EXTRACTION SYSTEM

TECHNICAL FIELD

The invention relates to a bead trimmer with a tool extraction system. The field of use of the invention is lines of production of shaped elements, especially tubes, with longitudinal weld beads.

BACKGROUND ART

The tubes are made from steel sheets which are moved and wound longitudinally to define the outside surface of the tube. The longitudinal edges of the sheet are welded together to close the tube, with a longitudinal weld bead. An external excess of bead has to be removed in the production line, in order to achieve a sufficiently regular external surface. The excess bead is usually removed mechanically using sharp tools which are brought into contact with the tube at a generatrix thereof along which the welding has been performed. The sliding longitudinal motion of the tube is also the movement used during the bead-trimming operation, the trimming tool remaining stationary.

In order not to halt production during tool replacement operations, two trimmers are arranged in the production line. During the tool-replacement operation on a first bead trimmer, the second is activated until the trimmer thereon has to be substituted, at which point the first trimmer is reactivated, and so on for successive cycles.

At present tool replacement is done manually and directly on the production line, by an operative. The operative is susceptible to considerable risks of injury, as he must work in proximity of the moving tube, as well as in proximity of the shaved beading emerging from the working bead trimmer. As well as this, the tool-changing operation is rather slow and awkward, as the operative is forced to bend forwards, towards the axis of the tube from a frontal position with respect to the shape of the base of the machine, preventing him from getting any closer.

The main aim of the present invention is to provide a bead trimmer provided with a tool extraction system, which obviates the drawbacks in the prior art.

An advantage of the invention is that is enables the tool to be changed in a safe and comfortable position for the operative.

A further advantage of the invention is that repositioning the tool after replacement is done automatically, rapidly and precisely.

DISCLOSURE OF INVENTION

Further characteristics and advantages of the present invention will better emerge from the detailed description that follows of a preferred but non-exclusive embodiment of a bead trimming machine with a tool extraction system, illustrated purely by way of a non-limiting example in the accompanying figures of the drawings, in which.

Figure 1:
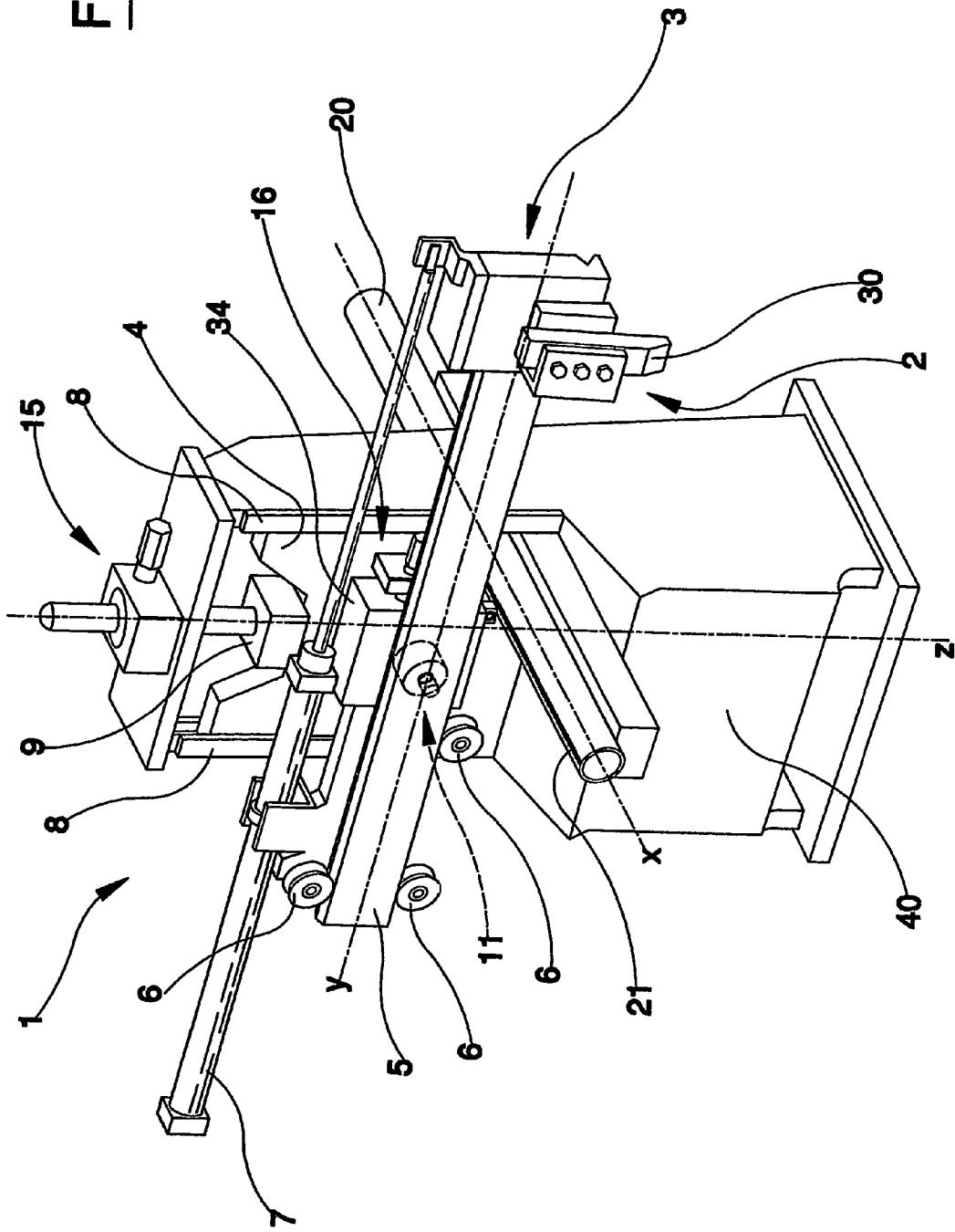
FIG. 1 is a schematic perspective view of the bead trimmer of the present invention in a tool-changing position.
Figure 2:
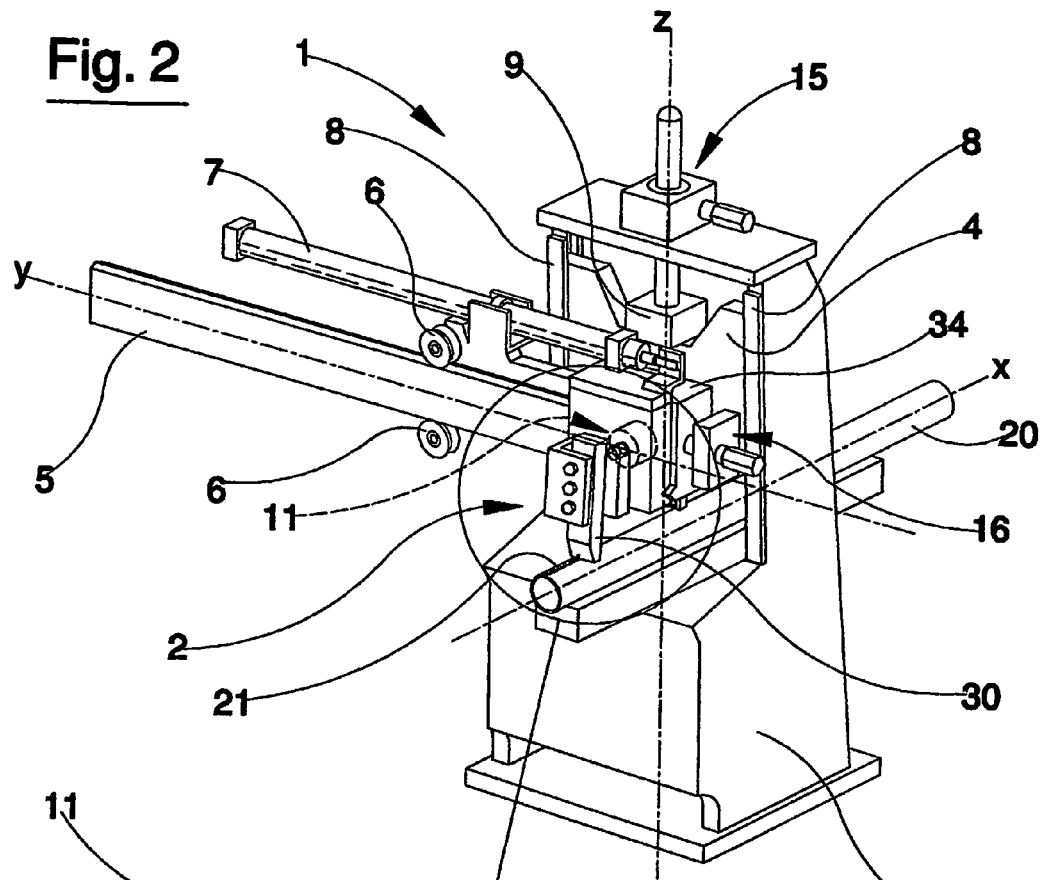
FIG. 2 is a schematic perspective view of the bead trimmer of the invention in an operating condition.
Figure 3:
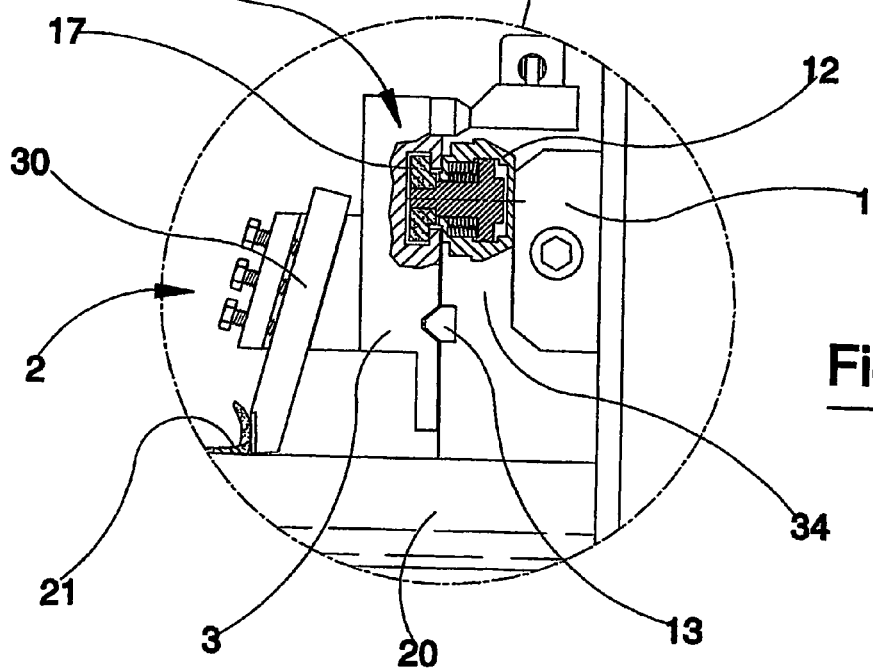
FIG. 3 is a sectioned detail of the bead trimmer of the invention.

With reference to the figures of the drawings, the bead trimmer of the invention comprises a tool-bearing turret 2 for removable fixture of a bead trimmer 30 tool, for example of a type having a cutting edge made on a carbide plate. The turret 2 is supported by means for controlled translation in at least one vertical direction z and at least one horizontal direction y which is transversal with respect to the longitudinal axis x between an internal work position and an external tool-changing position, with a run sufficient for extracting the turret 2 from the work zone.

The means for controlled translation comprise a first slide 3, to which the turret 2 is associated, which is slidable along the horizontal direction y between the internal work position, in which the tool 30 is aligned with the weld bead 21, and the external position for tool changing, in which the tool 30 is not aligned with the weld bead 21. The axis x is parallel to the sliding direction of the tube 20. The first slide 3 is associated to an intermediate slide 34 which is associated in turn to a second slide 4 which is slidable vertically on a bearing structure 40 along direction z between a lowered position, in which the tool 30 is in contact with the weld bead 21, and a raised position, in which the tool 30 is distanced from the weld bead 21.

The first slide 3 comprises an elongate portion of guide 5, vertically gripped between at least three wheels 6, associated to the intermediate slide 34, which exhibit rotation axes which are parallel to the axis x and are conformed in such a way as to prevent displacements of the first slide 3 along direction x and along direction z. The first slide 3 can be translated along direction y by a first actuator cylinder 7, which has a stem thereof connected to the first slide 3 and a body thereof connected to the intermediate slide 34. The wheels 6, which peripherally exhibit a gulley predisposed to engage on the lateral side of the portion of guide 5, are mounted on supports provided with elastic means predisposed to enable the wheels 6 to move in direction x.

The intermediate slide 34 is mobile along direction y with respect to the second slide 4 by means of a calibration mechanism 16, for example a screw-nut type mechanism, which enables a correct centring of the tool 30 with respect to the weld bead 21.

The second slide 4 is vertically slidable between two parallel guides 8 by means of a second actuator cylinder 9 which is operatively arranged between the second slide 4 and a vertical calibration mechanism 15, for example a screw-nut mechanism, which is operatively arranged between the second actuator cylinder 9 and a portion of the bearing structure 40.

The first slide 3 is blockable, with respect to the intermediate guide 34, when it is in an internal position, by means of a blocking device 11 which comprises a blocking and unblocking cylinder, operatively arranged between the first slide 3 and the intermediate slide 34, a stem of which exhibits a flange 17 predisposed to operate internally of a T-shaped hollow afforded on the first slide 3. The blocking and unblocking cylinder 12 is predisposed to exert a traction when at rest, by means of elastic means such as Belleville washers arranged coaxially to the stem, on the first slide 3 and to pull the first slide 3 into contact with the intermediate slide 34. When activated, the blocking and unblocking cylinder 12 exerts a force which is opposed to the force exerted by the elastic means and frees the first slide 3 from contact with the intermediate slide 34. The blocking and unblocking cylinder 12 operates in collaboration with a horizontal sliding guide 13, associated with the intermediate slide 34, which exhibits a wedge-shape in transversal section and which is predisposed to insert in a channel shaped specially therefor and afforded on the first slide 3, when the cylinder 12 is in the rest position. The sliding guide 13 is conformed and predisposed to define a vertical-direction reference with respect to the turet 2.

The invention offers considerable advantages. Firstly, the tool change can be performed in a safe position, as the operative can distance the turret from the production line. Both the displacement from the work position to the change-tool position, and the return to the work position, can be performed automatically, with considerable increase in the rapidity of the tool-changing operations. In particular the re-positioning of the tool after changing is performed rapidly and, especially, precisely thanks to the use of guides and calibration systems for the described positions.

The invention claimed is:

1. A bead trimmer for use in a production line of elements bearing longitudinal weld beads (21) in which one of the elements slides along a direction which is parallel to a longitudinal axis (x) thereof, wherein the bead trimmer comprises
   a tool-bearing member (2) for removably fixing a bead-trimmer tool (30), which member (2) is supported by means for translating the member (2) on command according to at least one vertical direction (z) and at least one horizontal direction (y) which at least one horizontal direction (y) is transverse with respect to the longitudinal axis (x) between an internal working position and an external tool-changing position, with a run which is sufficient to extract the member (2) from a working zone thereof;
   wherein the means for translating comprise a first slide (3) to which the tool-bearing member (2) is associated, the first slide (3) being slidable along the at least one horizontal direction (y) between the internal working position, in which the tool (30) is aligned with the weld bead (21), and the external tool-changing position, in which the tool (30) is not aligned with the weld bead (21);
   the first slide being associated to an intermediate slide (34) and being configured so as to be slidable in the at least one horizontal direction (y) relative to the intermediate slide (34), which intermediate slide (34) is associated to a second slide (4) which is vertically slidable on a bearing structure (40) along the at least one vertical direction (z) between a lower position, in which the tool (30) is in contact with the weld bead (21), and a raised position, in which the tool (30) is distanced from the weld bead (21);
   wherein the intermediate slide (34) is mobile, via a calibration mechanism, along the at least one horizontal direction (y) with respect to the second slide (4) in order to enable a centering of the tool (30) with respect to the weld bead (21).

2. The bead trimmer of claim 1, wherein the longitudinal axis of the element is horizontal.

3. The bead trimmer of claim 1, wherein the first slide (3) comprises an elongate portion of a guide (5), vertically gripped between at least three wheels (6), axes of rotation of which wheels (6) are parallel to the longitudinal axis (x), the at least three wheels (6) being associated to the intermediate slide (34) and being conformed in such a way as to prevent the first slide (3) from displacing along the longitudinal direction (x), and along the at least one vertical direction (z) relative to the intermediate slide (34), the first slide (3) being translatable along the at least one horizontal direction (y) by means of a first actuator cylinder (7) which exhibits a stem connected to the first slide (3) and a body connected to the intermediate slide (34).

4. The bead trimmer of claim 3, wherein the wheels (6) are mounted on supports having elastic means predisposed to enable the wheels (6) to move along a rotation axis thereof.

5. The bead trimmer of claim 1, wherein the second slide (4) is vertically slidable between two parallel guides (8) by means of an actuator cylinder (9) operatively arranged between the second slide (4) and a vertical calibration mechanism (15) which is operatively arranged between the actuator cylinder (9) and a portion of the bearing structure (40).

6. The bead trimmer of claim 1, wherein the calibration mechanism (16) is in the form of a screw-nut mechanism.

7. The bead trimmer of claim 1, wherein the first slide (3) is blockable with respect to the intermediate slide (34) when the first slide (3) is in the internal position, by means of a blocking device (11) comprising a blocking and unblocking cylinder (12) arranged between the intermediate slide (34) and the first slide (3), a stem of which cylinder (12) exhibits a flange (17) predisposed to operate internally of a T-shaped hollow afforded on the first slide (3), the blocking and unblocking cylinder (12) being predisposed in a rest position thereof to exert a traction force, by means of elastic means, on the first slide (3) and to pull the first slide (3) into contact with the intermediate slide (34), and, when activated, to exert a force which is opposed to the force exerted by the elastic means and to free the first slide (3) from contact with the intermediate slide (34).

8. The bead trimmer of claim 7, wherein the blocking and unblocking cylinder (12) operates in collaboration with a horizontal sliding guide (13) associated to the intermediate slide (34), which sliding guide (13) exhibits, in transverse section, a wedge shape and which is predisposed to insert in a channel shaped accordingly thereto and afforded on the first slide (3), when the blocking and unblocking cylinder (12) is in the rest position thereof, the sliding guide (13) being conformed and predisposed to define a reference with respect to a vertical direction for the tool-bearing member (2).

* * * * *